US011097730B2

(12) United States Patent
Bohrer et al.

(10) Patent No.: US 11,097,730 B2
(45) Date of Patent: Aug. 24, 2021

(54) IMPLICIT ACTIVATION AND CONTROL OF DRIVER ASSISTANCE SYSTEMS

(71) Applicant: VOLKSWAGEN AKTIENGESELLSCHAFT, Wolfsburg (DE)

(72) Inventors: Lorenz Bohrer, San Francisco, CA (US); Gagan Hothi, Palo Alto, CA (US); Jonathan Igner, San Francisco, CA (US); Esther Kim, San Jose, CA (US); Christian Lorenz, Discovery Bay, CA (US); Carey Smith, San Francisco, CA (US)

(73) Assignee: Volkswagen Aktiengesellschaft ( * ) Notice: Subject to any disclaimer, the term of this patent is extended or adjusted under 35 U.S.C. 154(b) by 85 days.

(21) Appl. No.: 16/210,727

(22) Filed: Dec. 5, 2018

(65) Prior Publication Data
US 2020/0180623 A1 Jun. 11, 2020

(51) Int. Cl.
B60W 30/16 (2020.01)
B60W 40/09 (2012.01)
G05D 1/00 (2006.01)
B60W 50/00 (2006.01)

(52) U.S. Cl.
CPC ......... *B60W 30/162* (2013.01); *B60W 40/09* (2013.01); *G05D 1/0061* (2013.01); *B60W 2050/0095* (2013.01); *B60W 2540/10* (2013.01); *B60W 2540/12* (2013.01); *B60W 2754/10* (2020.02); *G05D 2201/0213* (2013.01)

(58) Field of Classification Search
CPC ............... B60W 30/162; B60W 40/09; B60W 2754/10; B60W 2050/0095; B60W 2540/10; B60W 2540/12; B60W 2520/10; B60W 50/045; B60W 2050/0089; B60W 2050/0075; B60W 2050/0078; B60W 2050/0082; B60W 40/105; B60W 40/02; B60W 30/14; G05D 1/0061; G05D 2201/0213

See application file for complete search history.

(56) References Cited

U.S. PATENT DOCUMENTS

| 9,308,914 B1* | 4/2016 | Sun ................... B60K 28/06 |
| 2015/0284008 A1* | 10/2015 | Tan ................... B60W 30/12 701/28 |
| 2018/0198955 A1* | 7/2018 | Watanabe ........ G06K 9/00805 |
| 2018/0319402 A1* | 11/2018 | Mills ................... B60W 30/10 |

FOREIGN PATENT DOCUMENTS

| DE | 10247844 C1 | 10/2003 |
| DE | 10261624 A1 | 7/2004 |
| DE | 102008061392 A1 | 2/2010 |
| EP | 1747933 A1 | 1/2007 |
| WO | WO-2009074656 A1 * | 6/2009 ............. H04L 67/12 |

* cited by examiner

*Primary Examiner* — Rodney A Butler
(74) *Attorney, Agent, or Firm* — Barnes & Thornburg LLP

(57) ABSTRACT

A system, vehicle and method are provided that automatically activate and deactivate a driver assistance system. The automatic activation and deactivation depend on predefined criteria such as brake or gas pedal release, current vehicle velocity, and the presence of a lead vehicle.

20 Claims, 3 Drawing Sheets

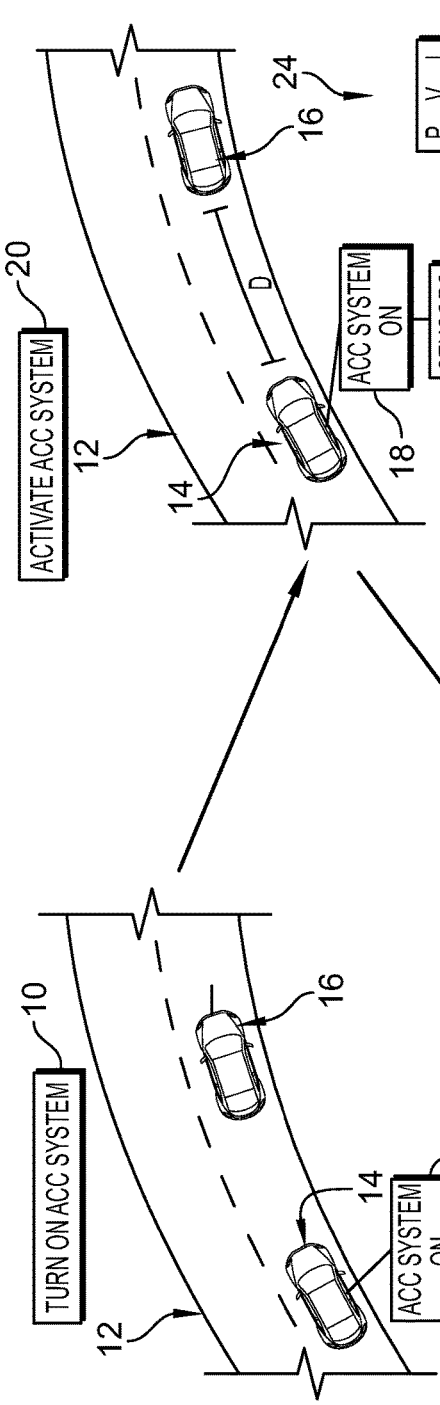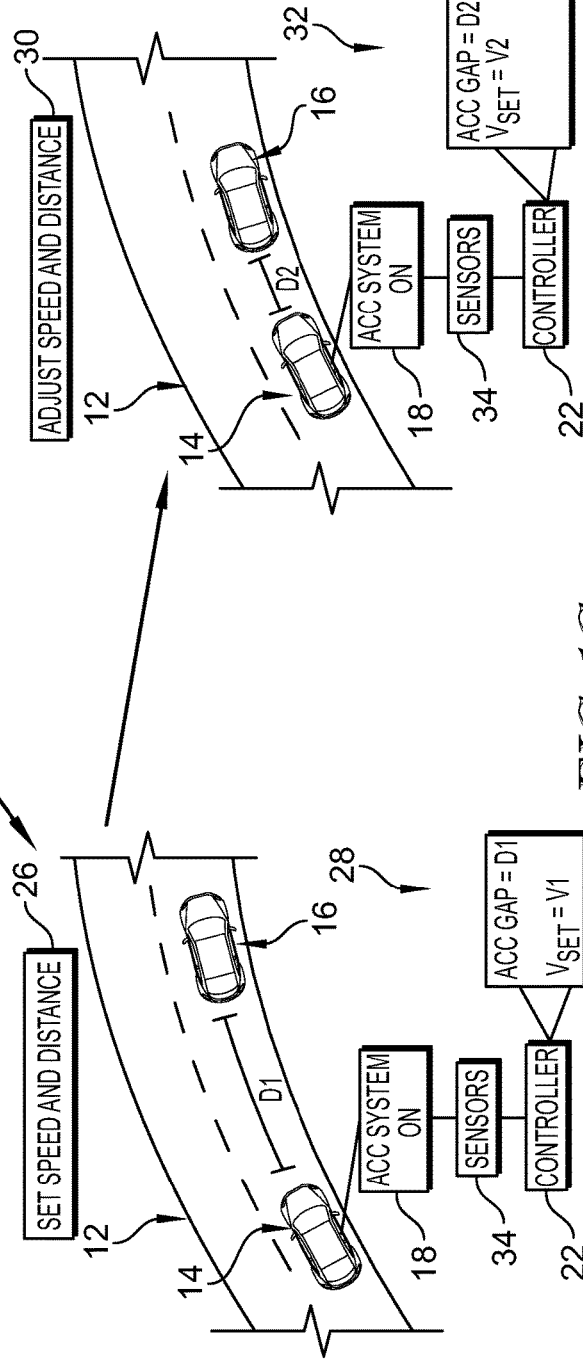

IMPLICIT ACTIVATION AND CONTROL OF DRIVER ASSISTANCE SYSTEMS

BACKGROUND

The present disclosure relates to systems, components and methodologies for implicitly controlling driver assistance systems. In particular, the present disclosure relates to systems, components and methodologies for automatically controlling adaptive cruise control systems.

SUMMARY

An adaptive cruise control system may be provided with a switch configured to turn the system on and off; a sensor configured to detect an environmental condition outside a transportation vehicle; and control means for automatically activating the system in response to detection that a transportation vehicle gas pedal and a transportation vehicle brake pedal are released, detection that an environmental condition is detected, and that the current vehicle speed meets a predefined threshold.

According to some embodiments, a transportation vehicle is provided with a gas pedal and a brake pedal, a sensor configured to sense current speed, and an adaptive cruise control processor configured to receive inputs from the gas pedal, the brake pedal, and the sensor, and in response to each determination that the driver has released the gas pedal and the brake pedal, determine whether to activate the adaptive cruise control functionality based on current speed of the vehicle.

In some embodiments, the system and vehicle may automatically set a velocity to be maintained based on sensor inputs. In some embodiments, the adaptive cruise control system, and the transportation vehicle further may be configured to detect a lead vehicle traveling directly in front of the vehicle and automatically set a gap distance to be automatically maintained between the vehicle and the lead vehicle.

In some embodiments, the adaptive cruise control system, and the transportation vehicle further comprise one or more of GPS, navigation, and identification systems. The system and vehicle may further automatically set and adjust vehicle speed and gap distance settings to a lead vehicle directly ahead of the vehicle based on inputs from these systems.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Further advantages, features and possibilities of using the present disclosed embodiments emerge from the description below in conjunction with the figures.

FIG. 1A-D constitute a diagrammatic view of an exemplary process of a vehicle in operation with the adaptive cruise control (ACC) system including turning the ACC system on, activating the ACC system, setting vehicle speed and distance, and adjusting vehicle speed and distance.

FIG. 1A shows a vehicle having an ACC system and the ACC system being turned on in the vehicle.

FIG. 1B illustrates how the ACC system is automatically activated by the controller in response to the satisfying one or more predefined criteria.

FIG. 1C depicts the ACC system setting an ACC gap between the vehicle and a lead vehicle directly in front of the vehicle in the same lane the vehicle is travelling in and a speed of travel for the vehicle.

FIG. 1D illustrates the ACC system adjusting the vehicle speed and the ACC gap to new values in response to one or more inputs to the controller.

DETAILED DESCRIPTION

Figure 2:
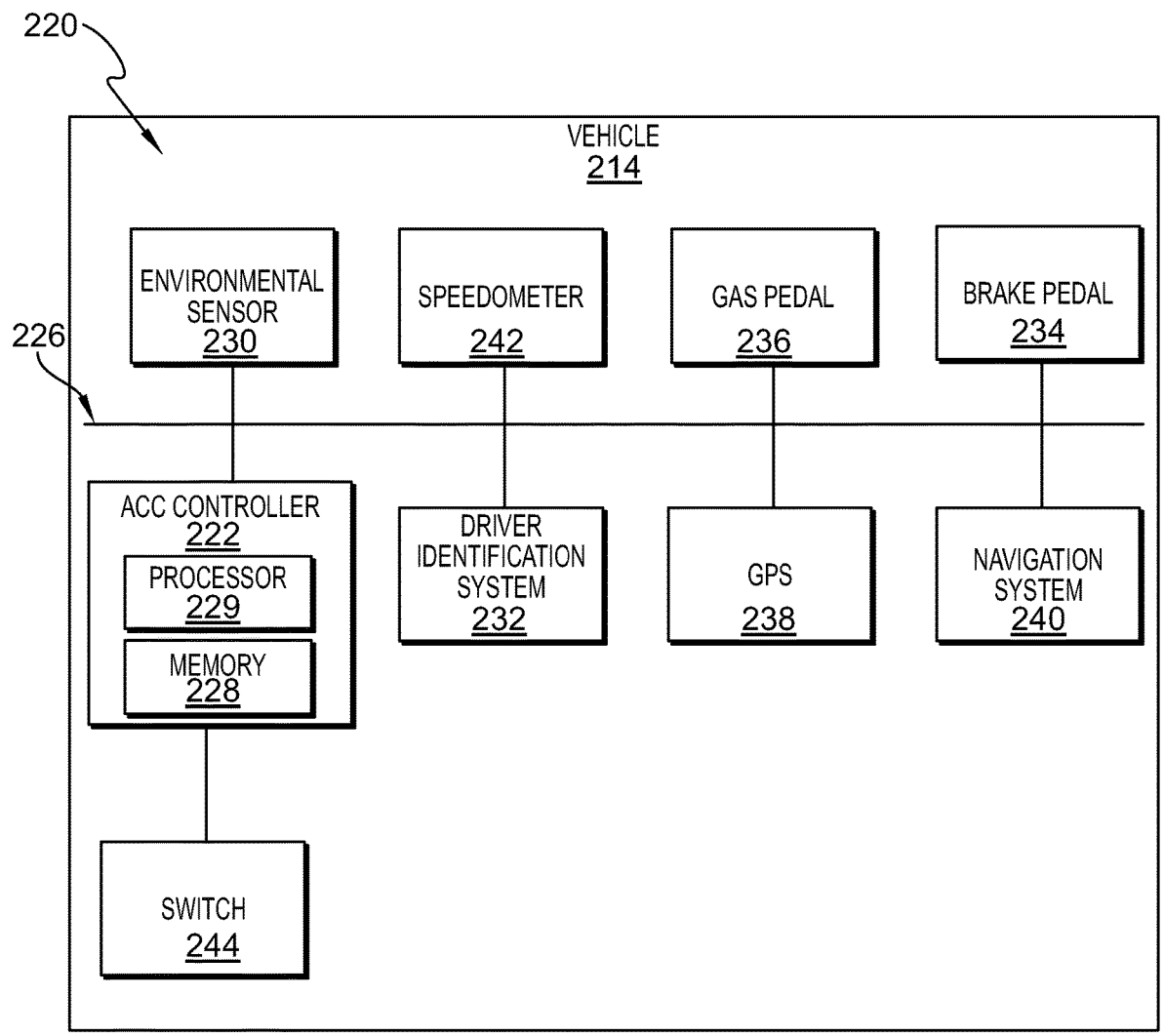
FIG. 2 is a diagrammatic view of a vehicle with an integrated adaptive cruise control system, an adaptive cruise control system controller, and the various vehicle components and systems that may be in communication with the controller.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

FIGS. 1A-1D constitute a diagrammatic view of an exemplary implicit activation and control driver assistance system, in particular, an adaptive cruise control (ACC) system. The ACC system may be automatically activated and automatically set and adjust vehicle operations.

In FIG. 1A, a vehicle 14 is illustrated traveling on a road 12 in the same direction as a lead vehicle 16. A lead vehicle 16 may be any vehicle traveling in the same direction as vehicle 14 and in the same lane of a road 12 as vehicle 14 in front of vehicle 14. A vehicle operator may turn on ACC system so that the ACC system 18 is on, but not yet activated. ACC system 18 may be turned on by one or more of a switch, push button or touchscreen interface within the vehicle 14.

As shown in FIG. 1B, sensors 34 detect one or more conditions, and an ACC controller 22 implicitly, without further operator input, activates the ACC system 20 when the conditions satisfy one or more predefined criteria 24. By way of example, In FIG. 1B, sensors 34 may detect a velocity "V" of the vehicle 14, a pedal release "P" within the vehicle 14, and the presence of a lead vehicle 16 "L" in front of the vehicle 14. Predefined velocity criteria may be, for example, that the vehicle 14 is traveling at a speed above a predefined threshold. Predefined pedal release criteria may be, for example, that the operator of the vehicle has released and is not pressing the gas or brake pedals. Predefined lead vehicle criteria may be for example that a lead vehicle 16 has been identified a distance "D" directly ahead of the vehicle on the road 12 traveling in the same lane in the same direction.

FIG. 1C depicts that based on the predefined criteria being met in FIG. 1B, the vehicle speed and distance may be set 26. Controller 22 may control the ACC system operations without further input, by setting an ACC gap and a corresponding velocity 28 setting to be maintained. These setting are set so that the acceleration gap D1, or distance, between the vehicle 14 and the lead vehicle 16 is approximately maintained. FIG. 1D depicts automatically adjusting vehicle speed and distance 30 as long as the ACC system 18 remains on and is activated 20. By way of example, between FIGS. 1C and 1D, the operator of the vehicle 14, may have engaged the vehicle gas pedal and released it. Based on this action, the controller 22 may automatically determine the operator has a more aggressive driving style and adjust the ACC gap D2 to be shorter to correspond to this driving behavior and adjusted velocity V2 to maintain this shorter gap D2 in the settings 32. In another example, between FIGS. 1C and 1D, the operator of the vehicle 14, may have engaged the vehicle brake pedal and released it. Based on this action, the controller 22 may automatically determine that the operator would like a larger ACC gap between the vehicle 14 and lead vehicle 16 and adjust the velocity to maintain a larger gap in the settings 32. Still in a further example, sensors 34 may detect that the lead vehicle 16 has slowed down and automatically adjust the ACC gap distance and vehicle velocity settings 32 based on this detection.

As illustrated in FIG. 2, an ACC system 220 may be incorporated into a transportation vehicle 214. ACC system controller 222 may be linked other systems and sensors of the vehicle 214 via a vehicle communication bus 226. ACC controller 222 may be turned on and/or off via a switch 224 which may include a button, switch knob, touchscreen or other input interface. Controller 222 may include memory 228 on which instructions or logic are provided, and a processor 229 to control implicit activation of the ACC system 220. In some embodiments, the controller 222 may include a machine learning model that continuously updates its implicit activation speed and gap distance parameters based on historic driving behavior sensed over time, as well as driving behavior in particular driving situations or road and weather conditions. The controller 222 may be in communication with one or more environmental sensors 230 for sensing outside the vehicle and/or inside the vehicle. By way of example, exterior sensors may include lidar, camera, or other sensors for sensing surroundings including signs, other vehicles, lead vehicles, traffic lights, or other conditions affecting activation and automatic operation of the vehicle. Interior sensors may include biometric, camera, or other sensors used to identify the driver as part of an integrated driver identification system 232 that may be used for setting vehicle driver preference internal comfort settings. Driver identification system 232 can communicate driving style of that driver such as aggressive or cautious, stored in the driver identification system 232, to be used in activating the ACC system and setting speed and gap distance parameters.

Brake pedal 234 and gas pedal 236 may communicate with the controller 222 information about the state of the pedals, including whether or not they are being pressed by the driver and when they are released. Additionally brake pedal, and gas pedal 236 may receive operational inputs from the controller 222 to manage and maintain speeds and gap distances. GPS 238, navigation 240, and speedometer 242 may additionally provide inputs to the controller 22 regarding location, route guidance information and speed. For example the navigation system 240 may inform on intersections, speed limits, upcoming turns to the controller 222 to manage changes in speed.

Figure 3:
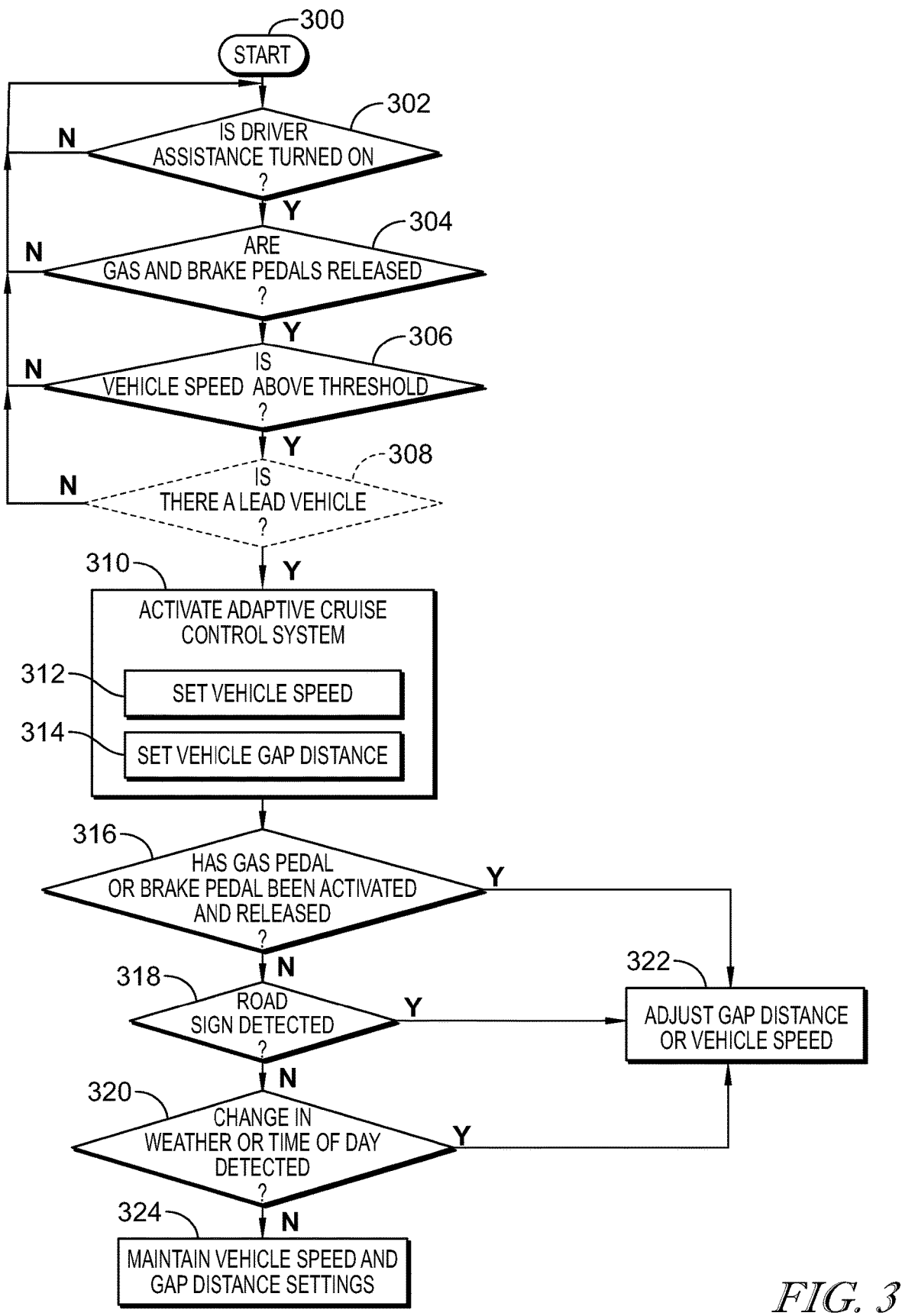
FIG. 3 is a diagrammatic flow chart of a method provided in accordance with disclosed embodiments.

In a method of operation of a driver assistance system 300, as shown in FIG. 3, system must be determined to be turned on 302, the gas and brake pedals must be released 304 and the vehicle must be above a predefined threshold speed 306. In some embodiments, the gas and brake pedals being released means no driver or operator force or instruction is acting on them. In some embodiments, the predefined threshold speed 306 is a value between 20-30 mph. If these conditions are met and optionally, if a lead vehicle is also detected 308, then the driver assistance system is activated 310. The method will continuously query conditions 302, 304, 306 during activation either sequentially, or in parallel, and if any of these conditions are not met, the driver assistance system is deactivated until the conditions 302, 304, 306 are met again.

Once the adaptive cruise control system is activated 310, a vehicle speed 312 is set to maintain a set vehicle gap distance 314 between the vehicle and an identified lead vehicle 308. The speed may be constantly adjusted based on changes in gap distance 314 due to changes in velocity of the lead vehicle. If no lead vehicle 308 is detected then vehicle speed 312 may be set based on one or more sensor inputs such as speed limit road signs, navigation system identification of type of road, such as rural country road, highway, or other road type, weather, time of day, and driver style.

Inputs that may cause the ACC system to automatically adjust the gap distance and vehicle speed 322 include activation and subsequent release of the brake pedal or gas pedal 316, detection of a new road sign 318, For example, as previously mentioned, activation of the brake or gas pedal will deactivate the ACC system. However, if activation and release are close in time to each other, or within a predefined time, when the ACC system activates again, it may use the previous speed and gap distance settings and set new speed and gap distances informed by those previous settings. In one example the brake is activated and released, and the system determines the driver would like more distance from a lead vehicle and sets a larger gap distance. In another example, the gas pedal is activated and released, and the system determines the driver would like to drive more aggressively with less distance from the lead vehicle and increases the speed and reduces the gap distance.

In another example the detection of a new road sign 318 may include a change in speed limit, a stop sign, a construction ahead or other sign and the system will adjust the set speed and/or gap distance accordingly. In another example, the system may detect ambient weather and time of day conditions 320 detect rain, change from day to night lighting conditions, snow, wind, or another condition that may cause the system to adjust speed. Any of these conditions 316, 318, 320 may be considered individually or in combination in setting and adjusting vehicle speed and vehicle gap distance 322. Conditions 316, 318, 320 are continuously sensed in series or in parallel for changes and otherwise vehicle speed and gap distance are maintained 324. The system will continuously maintain 324 or adjust 322 vehicle speed and gap distance until the system is turned off, the vehicle speed falls below the threshold speed, or the driver resumes operational control of the gas or brake pedal.

Existing driver assistance functions such as ACC system can improve driver safety and comfort by adjusting vehicle speed to maintain a safe distance. Existing driver assistance systems use a mix of brake and gas pedals, switches, physical monostable levers and/or buttons and menu based settings. For example, existing systems include a switch that the driver must press to turn the system on and off, as well as a button or monostable lever the driver must manipulate in order to activate the system and set and adjust target speeds. These physical levers and buttons that can hinder drivers from discovering and using the system. Additionally, these physical levers and buttons increase the risk of mode confusion, accidental activation, deactivation, and adjustment of the system.

Thus, disclosed embodiments provide the technical effect of enabling automatic activation of a cruise control system in response to detection that a transportation vehicle gas pedal and a transportation vehicle brake pedal are released, detection that an environmental condition is detected, and that the current vehicle speed meets a predefined threshold. Accordingly, the disclosed embodiments reduce the above identified risks by implicitly controlling activation and adjustment of various functions. The only user input the system relies on apart from a switch to turn the system on and off, are the normal user operation of the gas and brake pedals while operating the vehicle. The system automatically monitors when it should be activated, deactivated, or adjusted. In some embodiments, it also learns over time to differentiate between normal driver behavior and user preferences, and incidents caused by road or traffic conditions. In the disclosed embodiments, the driver no longer has to manually activate or adjust a driver assistance function. This is performed automatically upon release of the gas or brake pedal. Moreover, the driver still has the option to be in control by simply operating the gas or brake pedal as would be done under manual driving operations.

It should be understood that some or all of the methodology explained above may be performed on, utilizing or with access to one or more servers, processors and associated memory. Unless specifically stated otherwise, and as may be apparent from the above description, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the terms "controller" and "processor" may refer to any device or portion of a device that processes electronic data from registers and/or memory to transform that electronic data into other electronic data that may be stored in registers and/or memory.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An adaptive cruise control system comprising:
a switch configured to turn the system on and off;
a sensor configured to detect an environmental condition outside a transportation vehicle; and
a controller for automatically activating the system following to the system being turned on, in response to detection of release of a transportation vehicle gas pedal and a transportation vehicle brake pedal, detection of an environmental condition and that a current vehicle speed meets a predefined minimum speed threshold.

2. The adaptive cruise control system of claim 1, wherein the environmental condition is a detected presence of a lead vehicle in front of the transportation vehicle.

3. The adaptive cruise control system of claim 1, wherein the controller comprises a vehicle controller or processor.

4. The adaptive cruise control system of claim 1, wherein the automatic activation of the system includes setting and adjusting cruise control settings without operator intervention.

5. The adaptive cruise control system of claim 4, wherein the cruise control settings include transportation a vehicle speed and a gap distance between a lead vehicle and the transportation vehicle.

6. The adaptive cruise control system of claim 5, wherein the controller is configured to adjust transportation vehicle speed based on one or more inputs of information about navigation maps, road signs, road conditions, weather, and historic operator behavior.

7. The adaptive cruise control system of claim 5, wherein the controller is configured to adjust the gap distance based on one or more inputs of indicating whether the gas pedal or brake pedal was released and a speed of a lead vehicle.

8. A transportation vehicle comprising:
a gas pedal and a brake pedal,
a sensor configured to sense current speed, and
an adaptive cruise control processor configured to receive inputs from the gas pedal, the brake pedal, and the sensor,
wherein, the adaptive cruise control processor determines, following detection of release of the gas pedal and the brake pedal, whether to activate the adaptive cruise control functionality based on the current speed of the transportation vehicle, wherein the adaptive cruise control processor activates the adaptive cruise control in response to the current speed being above a predefined minimum threshold.

9. The transportation vehicle of claim 8, further comprising an environmental sensor for sensing one or more environmental conditions of the transportation vehicle, wherein the adaptive cruise control processor determines whether to activate the adaptive cruise control functionality based on the one or more sensed environmental conditions of the transportation vehicle.

10. The transportation vehicle of claim 9, wherein the one or more environmental conditions comprises the detection of a lead vehicle in front of the transportation vehicle.

11. The transportation vehicle of claim 10, wherein the one or more environmental conditions further comprises the speed of the detected lead vehicle.

12. The transportation vehicle of claim 8, wherein the adaptive cruise control processor is further configured to automatically adjust transportation vehicle speed and a distance between the transportation vehicle and a detected lead vehicle while the automated cruise control is activated.

13. The transportation vehicle of claim 8, further comprising an adaptive cruise control switch to turn the adaptive cruise control processor on and off.

14. The transportation vehicle of claim 8, further comprising one or more of a global positioning system, driver identification system, clock, and navigation system configured to provide inputs to the adaptive cruise control processor, wherein the adaptive cruise control processor is configured to determine whether to activate or adjust the adaptive cruise control based on the one or more inputs.

15. The transportation vehicle system of claim 8, wherein the adaptive cruise control processor includes a model that is configured to learn driver's behavior and adapt speed and gap distance settings based on the learned driving behavior.

16. An adaptive cruise control device comprising a processor and software stored in a memory that when executed causes the processor to:

determine whether a gas pedal and a brake pedal is released, and following a determination that the gas pedal and the brake pedal are released, activate adaptive cruise control functionality in response to a predetermined minimum vehicle speed threshold is met and a lead vehicle is detected.

17. The control of claim 16, wherein the adaptive cruise control functionality includes automatically adjust vehicle speed and distance between the vehicle and the lead vehicle.

18. The control of claim 16, wherein the processor is further configured to automatically adjust vehicle speed and gap distance based on one or more of navigation map, road sign, road conditions, weather, time of day, and historic driver behavior inputs.

19. The control of claim 16, wherein in response to a gas pedal pressed and a lead vehicle detected, the control automatically reduces the gap distance in response to release of the gas pedal.

20. The control of claim 16, wherein in response to a brake pedal pressed and a lead vehicle detected, the control automatically increases the gap distance in response to release of the brake pedal.

* * * * *